United States Patent [19]
Lindsay

[11] 3,911,748
[45] Oct. 14, 1975

[54] COIL FOR PRESSURE GAUGE

[76] Inventor: James E. Lindsay, 24712 Enerene Circle, El Toro, Calif. 92630

[22] Filed: Sept. 24, 1973

[21] Appl. No.: 399,865

Related U.S. Application Data

[63] Continuation of Ser. No. 225,891, Feb. 14, 1972, abandoned.

[52] U.S. Cl. .................................................. 73/418
[51] Int. Cl. .............................................. G01l 7/04
[58] Field of Search ...................... 73/418, 411–417, 73/368.6; 92/91, 92

[56] References Cited
UNITED STATES PATENTS
3,375,719  4/1968  Lindsay................................ 73/411
3,407,665  10/1968  Noakes et al. ........................ 73/418
3,805,619  4/1974  Wunderlich .......................... 73/418

Primary Examiner—Donald O. Woodiel
Attorney, Agent, or Firm—Harris, Kern, Wallen & Tinsley

[57] ABSTRACT

A coil for a Bourdon tube pressure sensor having a flat spiral section and a helical section. A pressure sensor incorporating the coil, with an indicating shaft coaxial with the coil and coupled to the helical section by a sliding arm for calibration.

4 Claims, 5 Drawing Figures

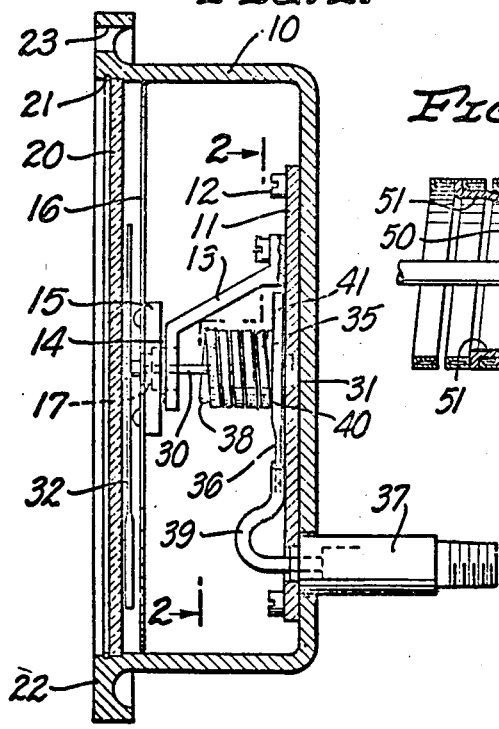
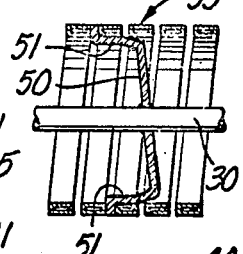
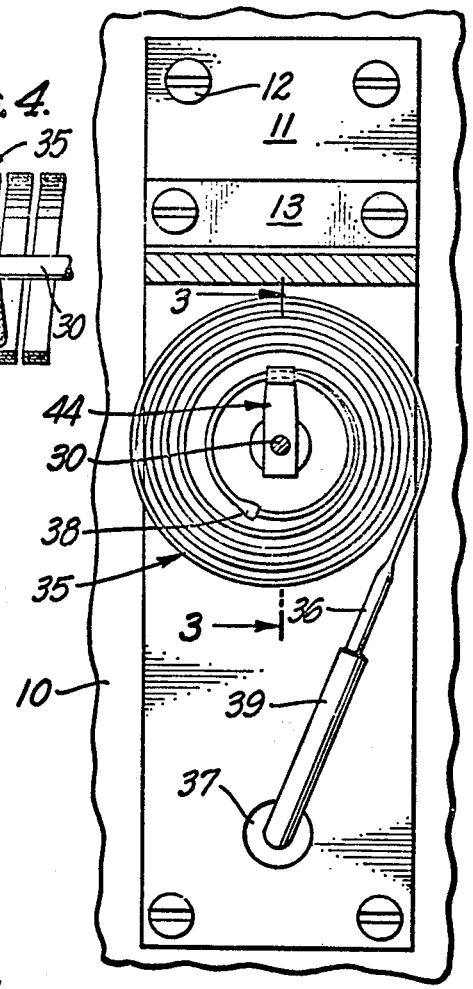
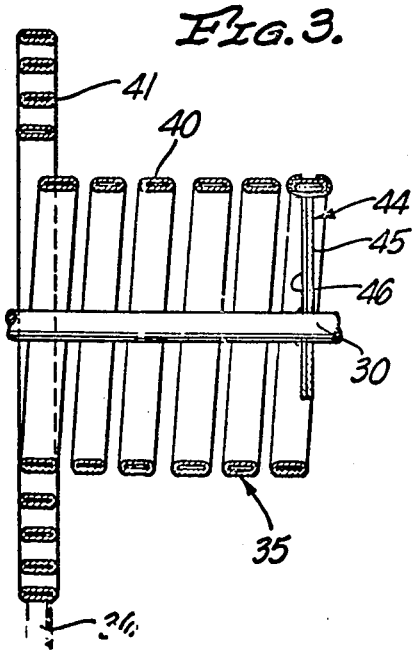
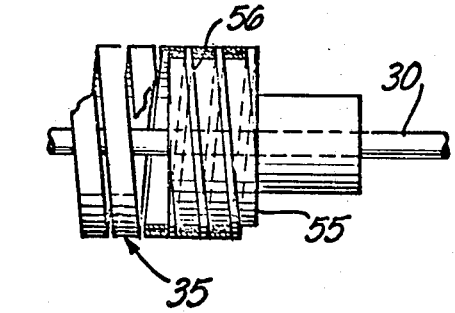

COIL FOR PRESSURE GAUGE

This is a continuation of application Ser. No. 225,891, filed Feb. 14, 1972 now abandoned.

This invention relates to Bourdon tube pressure sensors and to coils for such sensors. Bourdon tube type instruments have been utilized for a long time for pressure sensing and indicating. In a typical instrument, a length of tubing is flattened and wound into a flat spiral. When one end of the tube is connected to the pressure source and the other end is closed, with a pointer or other indicating device attached at the closed end, changes in pressure within the tube cause the spiral to unwind and wind, driving the indicating device. The flat spiral wound tube is easy to wind, inexpensive to manufacture, and provides a large motion for a relatively small unit. However, it is difficult to manufacture the flat spiral tube to close tolerances and it is difficult to calibrate instruments incorporating the flat spiral tube.

A helical wound tube has also been used in Bourdon tube pressure sensors and typical examples are shown in U.S. Pats. Nos. 2,929,249 and 3,375,719 and the references cited therein. The helical wound tube is more expensive to manufacture being more difficult to wind and does not have as great a mechanical movement for a given size of instrument. However the helical tube can be manufactured to closer tolerances and mechanisms have been developed for accurate calibration of instruments incorporating the helical tube. Using the calibration system with the clip described in the aforesaid U.S Pat. No. 3,375,719, pressure gauges with helical Bourdon tubes can be manufactured to an accuracy of one-quarter to one-tenth percent.

In the Bourdon tube of the present invention, the coil is wound with a flat spiral section and a helical section to obtain the ease of manufacture and large output of the flat spiral coil and at the same time obtain the accuracy and ease of calibration of the helical coil.

In the drawing,

FIG. 1 is a sectional view through a pressure gauge incorporating a preferred embodiment of the coil of the present invention;

FIG. 2 is an enlarged partial sectional view taken along the line 2—2 of FIG. 1;

FIG. 3 is a sectional view taken along the line 3—3 of FIG. 2; and

FIGS. 4 and 5 are views similar to that of FIG. 3 showing alternate forms of the calibration device.

The pressure gauge illustrated in the drawing includes a cup-shaped housing 10 with a bearing plate 11 affixed to the bottom by screws 12. A bracket 13 is mounted on the plate 11 and supports a bushing 14 and a disc 15 carrying a scale plate 16. A bearing 17 may be mounted in the disc 15. The housing is closed by a cover glass 20 held in place against a shoulder of the housing by a snap ring 21. A flange 22 on the housing is provided with screw openings 23 for mounting the gauge in an instrument panel. Of course, other conventional gauge designs can be utilized as desired.

A rotating shaft 30 may be journaled in the bearing 17 and another bearing 31 in the plate 11 for rotation. A pointer 32 is mounted on one end of the shaft 30 for movement along the scale of the plate 16.

A Bourdon tube coil 35 is positioned in the housing about the shaft 30 with one end 36 of the tube inserted into a capillary tube 39 mounted in a fitting 37 which provides for connecting the interior of the tube 35 to a pressure source. In the preferred embodiment illustrated, the major portion of the length of tubing forming the tube 35 is flattened in the conventional manner, with the end of the flattened section closed as indicated by 38, by any suitable means such as brazing. A portion of the length of tubing is wound into a helical section 40 and an adjacent portion is wound into a flat spiral section 41.

The tube 35 is coupled to the shaft 30 by a clip 44, which may correspond to the clip 65 illustrated in the aforesaid U.S. Pat. No. 3,375,719. Two pieces of metal 45, 46, preferably of spring material, are joined together as by spot welding, with the outer ends bent into hook-shaped gripping members for positioning about the tubing, as best seen in FIG. 3. The clip 44 is fixed to the shaft 30, as by inserting the shaft through openings in the pieces 45, 46 and brazing or welding the clip to the shaft or use of epoxy or other type cement. The hook-shaped ends are dimensioned to resiliently grip the tubing and to drive the shaft 30 as the tubing moves in response to changes in pressure within the tubing. However, since the clip is not fixed to the tubing, the clip may be manually moved along the tubing during calibration so that the pointer 32 indicates the exact pressure that is being applied at the fitting 37.

Some alternative forms for the calibration device which couples the pointer shaft 30 to the coil 35 are shown in FIGS. 4 and 5. The clip 50 of FIG. 4 is particularly well suited for small diameter coils (e.g. less than ¼ inch). The clip 50 may be stamped into a hat shape from stainless steel strip stock in the order of 0.010 inches thick. The distance across the arm sections 51 of the clip 50 may be made slightly greater than the inside diameter of the helical section 40 of the coil so that the clip is resiliently retained within the coil. The clip 50 is used in the same manner as the clip 44.

In the embodiment of FIG. 5, a cylindrical member 55 is provided with a helical groove 56 on the outer surface so that the member 55 may be threaded into the helical section 40 of the coil. The pointer shaft 30 is fixed to the member 55. This construction provides a large area of contact between the coil and the member 55 and permits omission of the lower bearing 31.

In a simpler form of instrument, the pointer 32 may be mounted directly on the closed end 38 of the coil with calibration being achieved by bending the pointer.

With this coil construction, very accurate calibration can be obtained. At the same time, the large motion and ease of manufacture associated with the flat spiral coil is also obtained. In a typical pressure sensor utilizing the coil of the invention, the major portion of the output indication is produced by expansion in the flat spiral coil, with a small portion of the movement being due to the helical coil. However, the significant and critical calibration is achieved in the helical coil section with the result that the advantages of both types of coils are obtained.

I claim:

1. In a pressure sensor, the combination of:
   a. a housing;
   b. a one-piece Bourdon tube in said housing comprising a flat spiral section with a plurality of turns having a common transverse central plane, and a coaxial cylindrical helical section with a plurality of turns, said spiral and helical sections providing said tube with a T-shaped configuration in a longitudinal plane containing the axis of said sections;

c. a fitting carried in said housing for connection to a pressure source, with one end of said tube connected to said fitting and with the other end closed;
d. a pressure indicating means in said housing;
e. means for coupling said tube adjacent said closed end to said pressure indicating means;
f. said pressure indicating means having a rotating shaft mounted in said housing and coaxial with said spiral and helical sections of said tube;
g. said means for coupling including an arm fixed to said shaft and frictionally engaged with said tube, with said arm movable along said tube; and
h. said spiral section being adjacent said one end of said tube and said helical section being adjacent said closed end, with said arm engaging said helical section.

2. In a pressure sensor, the combination of:
a. a housing;
b. a one-piece Bourdon tube in said housing comprising a flat spiral section with a plurality of turns having a common transverse central plane, and a coaxial cylindrical helical section with a plurality of turns, said spiral and helical sections providing said tube with a T-shaped configuration in a longitudinal plane containing the axis of said sections;
c. a fitting in and connected to said housing for connection to a pressure source, with one end of said tube connected to said fitting and with the other end closed;
d. a pressure indicating means in said housing; and
e. means connected to said helical section of said tube for calibrating said pressure indicating means.

3. A pressure sensor according to claim 2 wherein said one end of said tube constitutes the outer end of said spiral section of said tube and said closed end of said tube constitutes the terminus of said helical section thereof, whereby said fitting anchors said outer end of said spiral section of said tube.

4. A pressure sensor as defined in claim 3 wherein said calibrating means including means adjustable helically along said helical section of said tube adjacent said terminus thereof.

* * * * *